(12) United States Patent
Zhang et al.

(10) Patent No.: US 12,078,779 B2
(45) Date of Patent: Sep. 3, 2024

(54) CAMERA OPTICAL LENS

(71) Applicant: ZHEJIANG SUNNY OPTICS CO., LTD., Yuyao (CN)

(72) Inventors: Yi Zhang, Yuyao (CN); Kaiyuan Zhang, Yuyao (CN); Fujian Dai, Yuyao (CN); Liefeng Zhao, Yuyao (CN)

(73) Assignee: ZHEJIANG SUNNY OPTICS CO., LTD., Yuyao (CN)

( * ) Notice: Subject to any disclaimer, the term of this patent is extended or adjusted under 35 U.S.C. 154(b) by 391 days.

(21) Appl. No.: 17/144,741

(22) Filed: Jan. 8, 2021

(65) Prior Publication Data

US 2021/0286151 A1    Sep. 16, 2021

(30) Foreign Application Priority Data

Mar. 12, 2020    (CN) .......................... 202010170317.5

(51) Int. Cl.
| | | |
|---|---|---|
| *G02B 13/00* | (2006.01) | |
| *G02B 3/00* | (2006.01) | |
| *G02B 27/00* | (2006.01) | |
| *H04N 23/55* | (2023.01) | |

(52) U.S. Cl.
CPC ........... *G02B 13/002* (2013.01); *G02B 3/005* (2013.01); *G02B 27/0025* (2013.01); *H04N 23/55* (2023.01)

(58) Field of Classification Search
CPC .................. G02B 13/002; G02B 3/005; G02B 27/0025; G02B 13/18; G02B 5/04; G02B 13/0065; G02B 13/007; G02B 13/003; G02B 9/04; G02B 9/06; G02B 9/08; G02B 9/10; G02B 13/005; G02B 9/56; G02B 13/0025; G02B 17/00; G02B 27/0012; G02B 25/00; G02B 1/00; G02B 27/00; G02B 13/00; G02B 3/00; H04N 23/55
USPC ....... 359/708, 717, 726, 728, 736, 739, 669, 359/678, 692
See application file for complete search history.

(56) References Cited

U.S. PATENT DOCUMENTS 5,991,103 A * 11/1999 Togino ............... G02B 17/0816
                                                                                            359/834
7,889,429 B2 * 2/2011 Achtner ............... G02B 25/001
                                                                                            359/630

(Continued)

*Primary Examiner* — Thomas K Pham
*Assistant Examiner* — Kuei-Jen L Edenfield
(74) *Attorney, Agent, or Firm* — Birch, Stewart, Kolasch & Birch, LLP

(57) ABSTRACT

A camera optical lens is provided consisting of: an optical path turning element and a second lens having a refractive power. The optical path turning element has a refractive power and has an incident surface, a reflecting surface and an exit surface, both the incident surface and the exit surface are aspherical lens surfaces, the reflecting surface is a planar lens surface. The optical path turning element is configured so that light incident on the optical path turning element through the incident surface along a direction of a Y optical axis is reflected by the reflecting surface and then exits through the exit surface along a direction of an X optical axis, where the direction of the Y optical axis and the direction of the X optical axis cross each other; and wherein a total effective focal length f of the camera optical lens can satisfy 20 mm≤f≤30 mm.

8 Claims, 8 Drawing Sheets

(56) References Cited

U.S. PATENT DOCUMENTS

| | | | | |
|---|---|---|---|---|
| 8,531,774 | B2* | 9/2013 | Kubota | G02B 25/001 |
| | | | | 359/644 |
| 10,948,696 | B2* | 3/2021 | Shabtay | G02B 9/60 |
| 2015/0253647 | A1* | 9/2015 | Mercado | G02B 13/002 |
| | | | | 359/708 |
| 2016/0170185 | A1* | 6/2016 | Kim | G02B 13/0065 |
| | | | | 359/731 |
| 2016/0231540 | A1* | 8/2016 | Mercado | G02B 13/004 |
| 2017/0276913 | A1* | 9/2017 | Yao | G02B 13/0045 |
| 2019/0331897 | A1* | 10/2019 | Lee | G02B 13/007 |
| 2020/0064527 | A1* | 2/2020 | Shigemitsu | G02B 13/007 |

* cited by examiner

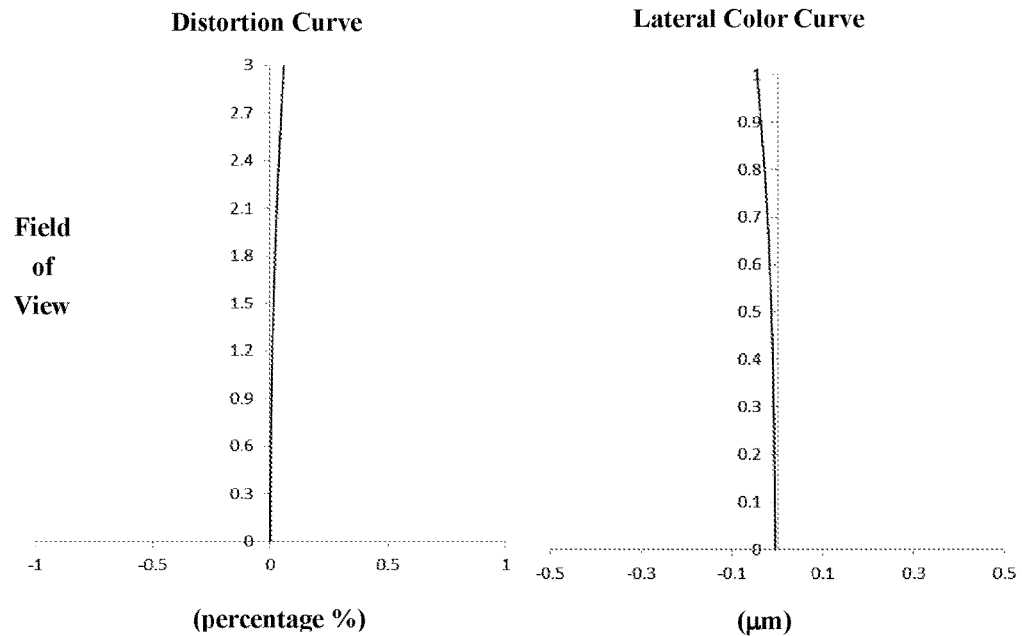
Fig. 2C
Fig. 2D
Fig. 3

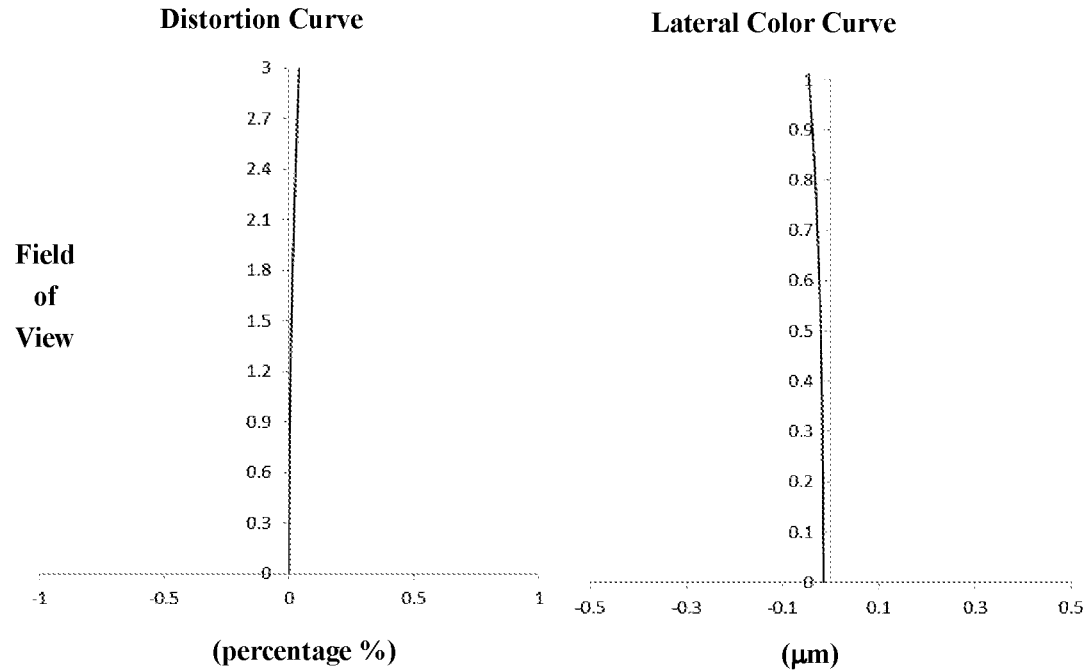
Fig. 6C
Fig. 6D
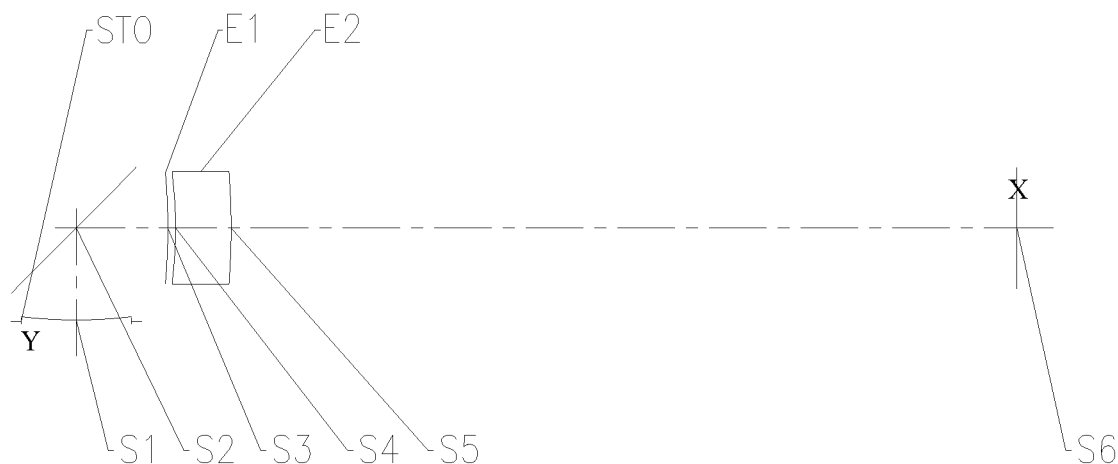
Fig. 7

CAMERA OPTICAL LENS

CROSS-REFERENCE TO RELATED APPLICATIONS

The present application claims the priority of Chinese patent application No. 202010170317.5, filed on Mar. 12, 2020, which is hereby incorporated by reference in its entirety.

TECHNICAL FIELD

The present application relates to a camera optical lens, and more specifically, to a camera optical lens including two lens sheets.

TECHNICAL BACKGROUND

With the rapid development of the smartphone industry, mobile phone lenses are developing towards high resolution, large field of view, lightweight and versatility. This requires the optical system of the mobile phone lens to simultaneously have multiple characteristics of large aperture, long focal length, wide field of view, compact structure, high image quality, low distortion and so on. Faced with these high requirements, the systems of the mobile phone lenses are becoming more and more complex, from the beginning of mobile phone systems that require 4 or 5 lens sheets to the current mobile phone systems that require 7 or 8 lens sheets, especially telephoto lenses. Generally, the number of lenses is increased to take into account the telephoto properties and high imaging quality.

However, the increase of system lens sheets is more complicated and difficult whether during optimization in the early stage or manufacturing in the later stage. How to use fewer lens sheets to manufacture a telephoto lens with high imaging quality is one of the mainstream research directions in this field.

SUMMARY

The present application provides a camera optical lens suitable for portable electronic products that can at least or partially solve at least one of the above-mentioned shortcomings in the prior art, for example, a camera lens that achieves the telephoto properties by using a combination of one prism and one lens sheet.

The present application provides a camera optical lens, comprising, in order from an object side to an image side: an optical path turning element and a second lens having a refractive power, wherein the optical path turning element has a refractive power and has an incident surface, a reflecting surface and an exit surface, both the incident surface and the exit surface are aspherical lens surfaces, the reflecting surface is a planar lens surface, and the optical path turning element is configured so that light incident on the optical path turning element through the incident surface along a direction of a Y optical axis is reflected by the reflecting surface and then exits through the exit surface along a direction of an X optical axis, where the direction of the Y optical axis and the direction of the X optical axis cross each other.

In one implementation, a total effective focal length f of the camera optical lens can satisfy 20 mm≤f≤30 mm.

In one implementation, the Y optical axis is approximately perpendicular to the X optical axis.

In one implementation, the camera optical lens further comprises a diaphragm arranged between the object side and the optical path turning element, and a distance EPP from the diaphragm to the incident surface of the optical path turning element on the X optical axis may satisfy 0 mm<EPP<0.1 mm.

In one implementation, the total effective focal length f of the camera optical lens and a distance BFL from an image side surface of the second lens to an imaging plane of the camera optical lens on the X optical axis may satisfy 1<f/BFL<1.5.

In one implementation, the total effective focal length f of the camera optical lens and an effective focal length f1 of the optical path turning element may satisfy 1.5<f/f1<2.0.

In one implementation, the total effective focal length f of the camera optical lens and an effective focal length f2 of the second lens may satisfy −1.0<f/f2<−0.5.

In one implementation, an entrance pupil diameter EPD of the camera optical lens and a half of a diagonal length ImgH of an effective pixel region on an imaging plane of the camera optical lens may satisfy 2.0<EPD/ImgH≤3.0.

In one implementation, an Abbe number V1 of the optical path turning element and an Abbe number V2 of the second lens may satisfy 50<(V1+V2)/2<55.

In one implementation, a refractive index N1 of the optical path turning element and a refractive index N2 of the second lens may satisfy 0.15≤N2−N1<0.3.

In one implementation, the total effective focal length f of the camera optical lens and a center thickness CT2 of the second lens on the X optical axis may satisfy 10≤f/CT2≤17.

In the present application, two lens sheets (i.e., one prism and one lens sheet) are adopted. The refractive power, surface type, the center thickness of each lens sheet, the on-axis distances between the respective lens sheets, and the like are reasonably distributed, so that the above-mentioned camera optical lens has at least one beneficial effect of long focal length, miniaturization, high imaging quality and so on.

BRIEF DESCRIPTION OF THE DRAWINGS

Other features, objectives and advantages of the present application will become more apparent from the following detailed description of non-limiting implementations in conjunction with the drawings. In the drawings:

FIGS. 2A to 2D show a longitudinal aberration curve, astigmatism curve, distortion curve and lateral color curve of the camera optical lens according to Embodiment 1, respectively;

FIG. 3 shows a schematic structural diagram of a camera optical lens according to Embodiment 2 of the present application;

FIGS. 6A to 6D show a longitudinal aberration curve, astigmatism curve, distortion curve and lateral color curve of the camera optical lens according to Embodiment 3, respectively;

FIG. 7 shows a schematic structural diagram of a camera optical lens according to Embodiment 4 of the present application;

DETAILED DESCRIPTION OF THE EMBODIMENTS

Figure 1:
FIG. 1 shows a schematic structural diagram of a camera optical lens according to Embodiment 1 of the present application.

In order to better understand the present application, various aspects of the present application will be described in more detail with reference to the drawings. It should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature. Therefore, without departing from the teachings of the present application, a second lens discussed below may also be referred to as a third lens or a fourth lens.

In the drawings, for convenience of explanation, the thickness, size, and shape of the lens have been slightly exaggerated. Specifically, the shapes of spherical or aspherical surfaces shown in the drawings are shown by way of example. That is, the shapes of the spherical or aspheric surfaces are not limited to those shown in the drawings. The drawings are only examples and are not drawn strictly to scale.

Herein, a paraxial region refers to a region near an X optical axis. If a lens surface is convex and the position of the convex surface is not defined, then it means that the lens surface is convex at least in the paraxial region; and if the lens surface is concave and the position of the concave surface is not defined, then it means that the lens surface is concave at least in the paraxial region. A surface of each lens closest to an object side is referred as an object side surface of the lens, and a surface of each lens closest to an image side is referred as an image side surface of the lens.

It should also be understood that the terms "comprising", "comprise", "having", "including" and/or "include" when used in the present description, indicate the existence of stated features, elements and/or components, but does not exclude the presence or addition of one or more other features, elements, components and/or combinations thereof. Furthermore, when an expression such as "at least one of" appears before the list of listed features, it modifies the entire list of listed features, rather than the individual elements in the list. In addition, when describing the implementations of the present application, the use of "may" means "one or more implementations of the present application", and, the term "exemplary" refers to an example or illustration.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

The features, principles and other aspects of the present application will be described in detail below.

The camera optical lens according to an exemplary implementation of the present application may include an optical path turning element having a refractive power and a second lens having a refractive power in order from an object side to an image side. In the present application, there may be an air gap between the optical path turning element and the second lens. Since only one conventional lens (i.e., the second lens) is used in the entire camera optical lens, the camera optical lens can have a simpler structure than a normal mobile phone lens.

According to an exemplary implementation of the present application, the optical path turning element may have a positive refractive power, its incident surface may be convex, and its exit surface may be convex.

According to an exemplary implementation of the present application, the second lens may have a negative refractive power, its object side surface may be concave, and its image side surface may be convex.

According to an exemplary implementation of the present application, the optical path turning element may have an incident surface, a reflecting surface, and an exit surface. When light from a subject to be captured enters the optical path turning element through the incident surface along a direction of a Y optical axis, it can be totally reflected by the reflecting surface and turned to the exit surface to exit along a direction of an X optical axis, and pass through the second lens E2 to finally form an image on an imaging plane. The Y optical axis is approximately perpendicular to the X optical axis. Moreover, the reflecting surface passes an intersection point of the Y optical axis and the X optical axis. That is, the optical path turning element can be configured as a deflecting prism that can deflect light incident to it by 90°. Compared with conventional prisms, the use of this prism can not only reduce the loss of light energy in the optical system, but also can participate in the imaging of the entire optical system, so that the entire optical system can meet the needs of small size and compact structure of the system while meeting the characteristics of ultra-long effective focal length and high image quality.

In the implementation of the present application, at least one of an incident surface and an exit surface of each lens sheet is an aspheric lens surface, that is, at least one of the incident surface and the exit surface of the optical path turning element and the object side surface and the image side surface of the second lens is an aspheric lens surface. An aspheric lens is characterized in that the curvature changes continuously from the center of the lens to the periphery of the lens. Unlike a spherical lens having a constant curvature from the center of the lens to the periphery of the lens, the aspheric lens has better radius-of-curvature properties, and has the advantages of improving distortion aberration and improving astigmatism aberration. After the aspheric lens is adopted, the aberrations that occur during imaging can be eliminated as much as possible, thereby improving the imaging quality.

In an exemplary implementation, both the incident surface and the exit surface of the optical path turning element may be aspheric lens surfaces, and its reflecting surface is a planar lens surface. Both the incident surface and the exit surface of the optical path turning element are configured as aspheric lens surfaces, which can reduce the loss of light energy in the optical system and contribute to the telephoto ratio of the system.

In an exemplary implementation, the camera optical lens of the present application may satisfy a conditional expression of 20 mm≤f≤30 mm, where f is a total effective focal length of the camera optical lens. The conditional expression of 20 mm≤f≤30 mm is satisfied, which can meet the requirements of ultra-long effective focal length. At the same time, due to the use of the optical path turning element, a smaller number of conventional lenses can be used so that the structure is simple, and thus the needs of small size and compact structure of the system can also be met.

In an exemplary implementation, the camera optical lens of the present application may further include a diaphragm to improve the imaging quality of the camera lens. Optionally, the diaphragm may be arranged between the subject to be captured and the optical path turning element. The camera optical lens according to the present application may satisfy a conditional expression of 0 mm<EPP<0.1 mm, where EPP is a distance from the diaphragm to the incident surface of the optical path turning element on the X optical axis. More specifically, EPP may further satisfy 0 mm<EPP<0.05 mm, for example, EPP=0.03 mm. The diaphragm is arranged on the incident surface of the optical path turning element, which can control the amount of light entering the entire camera optical system. At the same time, by selecting an appropriate diaphragm position, the aberrations (coma, astigmatism, distortion and axial chromatic aberration) related to the diaphragm of the camera optical lens can be effectively corrected.

In an exemplary implementation, the camera optical lens of the present application may satisfy a conditional expression of 1<f/BFL<1.5, where f is the total effective focal length of the camera optical lens, and BFL is a distance from an image side surface of the second lens to an imaging plane of the camera optical lens on the X optical axis. More specifically, f and BFL may further satisfy 1.17≤f/BFL≤1.22. The conditional expression of 1<f/BFL<1.5 is satisfied, so that the camera optical lens has an ultra-long back focal length while having an ultra-long effective focal length, facilitating module assembly at the later stage of the camera lens.

In an exemplary implementation, the camera optical lens of the present application may satisfy a conditional expression of 1.5<f/f1<2.0, where f is the total effective focal length of the camera optical lens, and f1 is an effective focal length of the optical path turning element. More specifically, f and f1 may further satisfy 1.59≤f/f1≤1.90. The conditional expression of 1.5<f/f1<2.0 is satisfied, which can effectively control the contribution of the effective focal length of the optical path turning element to the total effective focal length of the entire camera lens, so that the total effective focal length of the camera lens reaches a larger ideal value.

In an exemplary implementation, the camera optical lens of the present application may satisfy a conditional expression of −1.0<f/f2<−0.5, where f is the total effective focal length of the camera optical lens, and f2 is an effective focal length of the second lens. More specifically, f and f2 may further satisfy −0.93≤f/f2≤−0.61. The conditional expression of −1.0<f/f2<−0.5 is satisfied, which can effectively control the contribution of the effective focal length of the second lens to the total effective focal length of the entire camera lens, so that the total effective focal length of the camera lens reaches a larger ideal value.

In an exemplary implementation, the camera optical lens of the present application may satisfy a conditional expression of 2.0<EPD/ImgH≤3.0, where EPD is the entrance pupil diameter of the camera optical lens, and ImgH is a half of a diagonal length of an effective pixel region on the imaging plane of the camera optical lens. More specifically, EPD and ImgH can further satisfy 2.29≤EPD/ImgH≤2.98. The conditional expression of 2.0<EPD/ImgH≤3.0 is satisfied, so that the camera lens has a larger field of view while meeting the performance of large aperture and high image quality.

In an exemplary implementation, the camera optical lens of the present application may satisfy a conditional expression of 50<(V1+V2)/2<55, where V1 is an Abbe number of the optical path turning element, and V2 is an Abbe number of the second lens. More specifically, V1 and V2 may further satisfy 51.17≤(V1+V2)/2≤54.08. The conditional expression of 50<(V1+V2)/2<55 is satisfied, so that the Abbe numbers of the two optical components are within the required specific ranges. Thus, the vertical-axis chromatic aberration, axial chromatic aberration, and chromatic spherical aberration of the camera lens can be strongly corrected, and thereby the image quality of the camera lens can be better ensured.

In an exemplary implementation, the camera optical lens of the present application may satisfy a conditional expression of 0.15≤N2−N1<0.3, where N1 is a refractive index of the optical path turning element, and N2 is a refractive index of the second lens. More specifically, N2 and N1 may further satisfy 0.16≤N2−N1≤0.24. The difference between the refractive indexes of the optical path turning element and the second lens is controlled to be within a small range, so that the material of each lens sheet of the lens can be reasonably selected, and the refractive power difference of the lens sheets can be controlled. As a result, the effective focal length can reach the required value, and at the same time, it can also ensure that the camera lens has the advantages of high image quality and small aberrations.

In an exemplary implementation, the camera optical lens of the present application may satisfy a conditional expression of 10≤f/CT2≤17, where f is the total effective focal length of the camera optical lens, and CT2 is a center thickness of the second lens on the X optical axis. More specifically, f and CT2 may further satisfy 10.40≤f/CT2≤16.50. The conditional expression of 10≤f/CT2≤17 is satisfied, which can ensure the effective focal length of the lens while meeting the machinability.

The camera optical lens according to the above-mentioned implementations of the present application may adopt a manner in which an optical path turning element (i.e., a prism) is matched with a conventional lens. For example, as described above, a manner of matching one prism with one conventional lens sheet is adopted. The refractive powers and surface shapes of the two optical components, the center thicknesses of the respective lens sheets, the on-axis distances between the respective lens sheets, and the like are reasonably distributed, which can effectively reduce the volume of the camera lens, reduce the sensitivity of the camera lens, and improve the machinability of the camera lens, so that the camera optical lens is more advantageous for production and machining and is applicable for portable electronic products. The camera optical lens configured as described above can also have beneficial effects such as long focal length, miniaturization, and high imaging quality.

However, it should be understood by those skilled in the art that the number of prisms or lenses constituting the camera optical lens can be changed without departing from the technical solution claimed in the present application, to obtain respective results and advantages described in the description. For example, although two lens sheets have been described in the implementations as an example, the camera optical lens is not limited to including two lens sheets. If necessary, the camera optical lens may also include other numbers of lens sheets.

Specific embodiments of the camera optical lens applicable to the above-mentioned implementations will be further described below with reference to the drawings.

Embodiment 1

A camera optical lens according to Embodiment 1 of the present application will be described below with reference to FIGS. 1 to 2D. FIG. 1 shows a schematic structural diagram of the camera optical lens according to Embodiment 1 of the present application.

As shown in FIG. 1, the camera optical lens according to an exemplary implementation of the present application includes a diaphragm STO, an optical path turning element E1, a second lens E2, and an imaging plane S6 in order from an object side to an image side.

The optical path turning element E1 is a deflecting prism, and has a positive refractive power and has an incident surface S1, a reflecting surface S2, and an exit surface S3, wherein the incident surface S1 is convex, the reflecting surface S2 is planar and the exit surface S3 is convex. Light incident along a Y optical axis through the incident surface S1 is reflected by the reflecting surface S2 and then exits along an X optical axis through the exit surface S3, wherein the Y optical axis is approximately perpendicular to the X optical axis and the reflecting surface S2 passes an intersection point of the Y optical axis and the X optical axis. The second lens E2 has a negative refractive power, and has a concave object side surface S4 and a convex image side surface S5. Light from an object sequentially passes through the respective surfaces S1 to S5 and finally forms an image on the imaging plane S6.

Table 1 shows a table of basic parameters of the camera optical lens of Embodiment 1, wherein the units of the radius of curvature, thickness, and focal length are all millimeters (mm).

TABLE 1

Embodiment 1: f = 26.00 mm, ImgH = 1.27 mm

| Surface No. | Surface type | Radius of curvature | Thickness | Material Refractive index | Dispersion coefficient | Focal length | Conic coefficient |
|---|---|---|---|---|---|---|---|
| OBJ | Spherical | Infinity | Infinity | | | | |
| STO | Spherical | Infinity | 0.0250 | | | | |
| S1 | Aspherical | 14.3989 | 2.0000 | 1.528 | 76.97 | 13.65 | 18.6248 |
| S2 | Spherical | Infinity | 2.0000 | 1.528 | 76.97 | | 0.0000 |
| S3 | Aspherical | −13.1389 | 1.3067 | | | | −16.2728 |
| S4 | Aspherical | −6.9815 | 2.5000 | 1.689 | 31.18 | −28.08 | 13.1303 |
| S5 | Aspherical | −12.4835 | 21.2668 | | | | 35.4595 |
| S6 | Spherical | Infinity | | | | | | where f is a total effective focal length of the camera optical lens, and ImgH is a half of a diagonal length of an effective pixel region on the imaging plane S6 of the camera optical lens.

In Embodiment 1, the incident surface S1 and the exit surface S3 of the optical path turning element E1 and the object side surface and image side surface of the second lens E2 are all aspherical, and the surface shape x of each aspherical lens can be defined by using but not limited to the following aspherical formula:

$$x = \frac{ch^2}{1 + \sqrt{1 - (k+1)c^2h^2}} + \sum A_i h^i \quad (1)$$

where x is a distance vector height from a vertex of the aspheric surface when the aspheric surface is at a height of h along the optical axis direction; c is paraxial curvature of the aspheric surface, c=1/R (that is, the paraxial curvature c is the reciprocal of the radius of curvature R in Table 1 above); k is a conic coefficient; and Ai is a correction coefficient of an i-th order of the aspheric surface. Higher-order coefficients $A_4$, $A_6$, $A_8$, $A_{10}$, $A_{12}$, $A_{14}$, $A_{16}$, $A_{18}$, $A_{20}$, $A_{22}$, $A_{24}$, $A_{26}$, $A_{28}$ and $A_{30}$ of each aspheric lens surface of S1 and S3 to S5 that are applicable in Embodiment 1 are given in Table 2 below.

TABLE 2

| Surface No. | A4 | A6 | A8 | A10 | A12 | A14 | A16 |
|---|---|---|---|---|---|---|---|
| S1 | −1.3687E+05 | 1.1955E+05 | −8.0967E+04 | −4.3507E+04 | −1.8553E+04 | −6.1877E+03 | −1.5655E+03 |
| S3 | 1.0891E+06 | 9.1551E+05 | 5.8693E+05 | 2.9232E+05 | 1.1231E+05 | 3.2387E+04 | 6.6333E+03 |
| S4 | −1.0482E−01 | −1.1401E−02 | −2.6001E−03 | −7.5613E−04 | −2.5253E−04 | −8.4576E−05 | −3.0008E−05 |
| S5 | −8.2980E−02 | −9.1698E−03 | −2.1200E−03 | −5.3659E−04 | −9.3191E−05 | 3.1790E−05 | 4.7044E−05 |

| Surface No. | A18 | A20 | A22 | A24 | A26 | A28 | A30 |
|---|---|---|---|---|---|---|---|
| S1 | −2.8452E+02 | −3.3463E+01 | −1.9481E+00 | 6.4608E−03 | −3.3828E−03 | −4.4041E−03 | −7.3579E−04 |
| S3 | 8.6389E+02 | 5.3961E+01 | 4.7623E−04 | 1.1168E−03 | −3.6774E−04 | −1.1013E−03 | −4.0667E−04 |
| S4 | −1.0895E−05 | −3.5946E−06 | −1.4297E−06 | −4.8459E−07 | 0.0000E+00 | 0.0000E+00 | 0.0000E+00 |
| S5 | 3.3772E−05 | 1.7689E−05 | 6.5769E−06 | 1.4078E−06 | 0.0000E+00 | 0.0000E+00 | 0.0000E+00 |

Figure 2A:
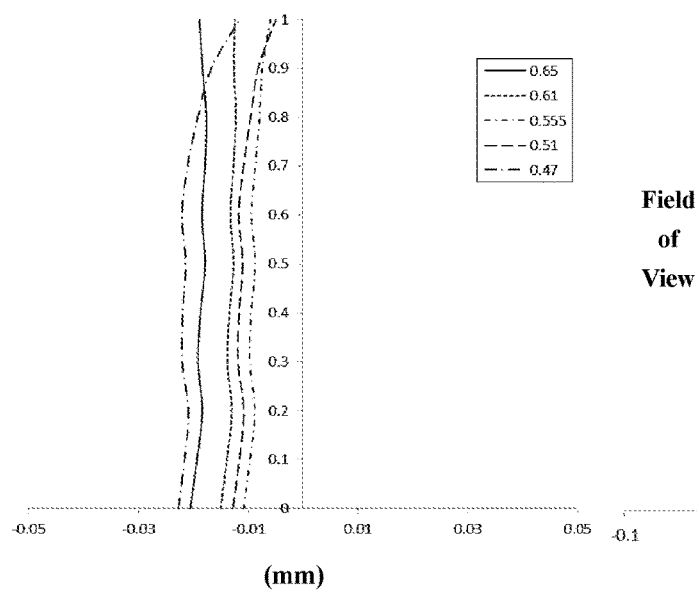
Figure 2B:
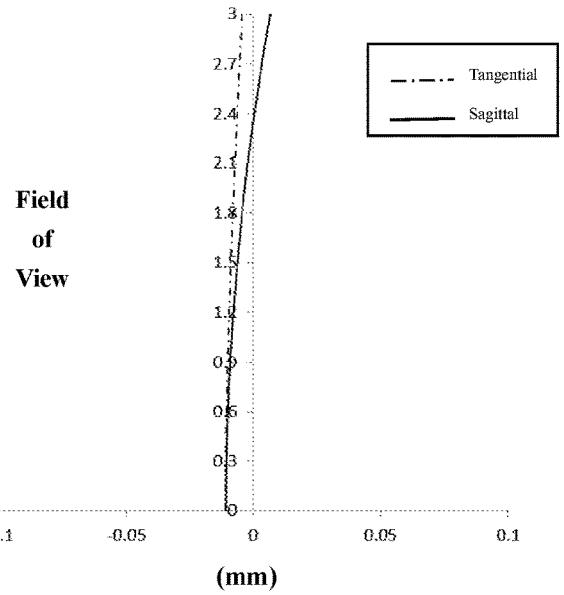

FIG. 2A shows a longitudinal aberration curve of the camera optical lens according to Embodiment 1, which represents the deviation of the converged focal point after light of different wavelengths passes through the camera lens. FIG. 2B shows an astigmatism curve of the camera optical lens according to Embodiment 1, which represents the curvature of the tangential image plane and the curvature of the sagittal image plane. FIG. 2C shows a distortion curve of the camera optical lens according to Embodiment 1, which represents distortion magnitude values corresponding to different fields of view. FIG. 2D shows a lateral color curve of the camera optical lens according to Embodiment 1, which represents the deviation of different image heights on the imaging plane after light passes through the camera lens. According to FIGS. 2A to 2D, it can be seen that the camera optical lens given in Embodiment 1 can achieve good imaging quality.

Embodiment 2

A camera optical lens according to Embodiment 2 of the present application will be described below with reference to FIGS. 3 to 4D. In this embodiment and the following embodiments, for the sake of brevity, the description of parts similar to those in Embodiment 1 will be omitted. FIG. 3 shows a schematic structural diagram of the camera optical lens according to Embodiment 2 of the present application.

As shown in FIG. 3, the camera optical lens according to an exemplary implementation of the present application includes a diaphragm STO, an optical path turning element E1, a second lens E2, and an imaging plane S6 in order from an object side to an image side.

The optical path turning element E1 is a deflecting prism, and has a positive refractive power and has an incident surface S1, a reflecting surface S2, and an exit surface S3, wherein the incident surface S1 is convex, the reflecting surface S2 is planar and the exit surface S3 is convex. Light incident along a Y optical axis through the incident surface S1 is reflected by the reflecting surface S2 and then exits along an X optical axis through the exit surface S3, wherein the Y optical axis is approximately perpendicular to the X optical axis and the reflecting surface S2 passes an intersection point of the Y optical axis and the X optical axis. The second lens E2 has a negative refractive power, and has a concave object side surface S4 and a convex image side surface S5. Light from an object sequentially passes through the respective surfaces S1 to S5 and finally forms an image on the imaging plane S6.

Table 3 shows a table of basic parameters of the camera optical lens of Embodiment 2, wherein the units of the radius of curvature, thickness, and focal length are all millimeters (mm). Table 4 shows higher-order coefficients of each aspheric lens surface that are applicable in Embodiment 2, wherein the surface shape of each aspheric surface can be defined by formula (1) given in Embodiment 1 described above.

TABLE 3

Embodiment 2: f = 27.30 mm, ImgH = 1.27 mm

| Surface No. | Surface type | Radius of curvature | Thickness | Material Refractive index | Material Dispersion coefficient | Focal length | Conic coefficient |
|---|---|---|---|---|---|---|---|
| OBJ | Spherical | Infinity | Infinity | | | | |
| STO | Spherical | Infinity | 0.0263 | | | | |
| S1 | Aspherical | 15.1188 | 2.1000 | 1.528 | 76.97 | 14.34 | 18.6248 |
| S2 | Spherical | Infinity | 2.1000 | 1.528 | 76.97 | | 0.0000 |
| S3 | Aspherical | −13.7958 | 1.3720 | | | | −16.2728 |
| S4 | Aspherical | −7.3306 | 2.6250 | 1.689 | 31.18 | −29.49 | 13.1303 |
| S5 | Aspherical | −13.1077 | 22.3302 | | | | 35.4595 |
| S6 | Spherical | Infinity | | | | | |

TABLE 4

| Surface No. | A4 | A6 | A8 | A10 | A12 | A14 | A16 |
|---|---|---|---|---|---|---|---|
| S1 | −1.4372E+05 | −1.2552E+05 | −8.5015E+04 | −4.5682E+04 | −1.9481E+04 | −6.4970E+03 | −1.6438E+03 |
| S3 | 1.1435E+06 | 9.6128E+05 | 6.1628E+05 | 3.0694E+05 | 1.1793E+05 | 3.4006E+04 | 6.9650E+03 |

TABLE 4-continued

| | | | | | | | |
|---|---|---|---|---|---|---|---|
| S4 | −1.1006E−01 | −1.1971E−02 | −2.7301E−03 | −7.9394E−04 | −2.6516E−04 | −8.8805E−05 | −3.1509E−05 |
| S5 | −8.7130E−02 | −9.6283E−03 | −2.2260E−03 | −5.6342E−04 | −9.7850E−05 | 3.3379E−05 | 4.9396E−05 |

| Surface No. | A18 | A20 | A22 | A24 | A26 | A28 | A30 |
|---|---|---|---|---|---|---|---|
| S1 | −2.9875E+02 | −3.5136E+01 | −2.0455E+00 | 6.7839E−03 | −3.5519E−03 | −4.6243E−03 | −7.7258E−04 |
| S3 | 9.0708E+02 | 5.6659E+01 | 5.0004E−04 | 1.1726E−03 | −3.8613E−04 | −1.1563E−03 | −4.2700E−04 |
| S4 | −1.1440E−05 | −3.7743E−06 | −1.5012E−06 | −5.0881E−07 | 0.0000E+00 | 0.0000E+00 | 0.0000E+00 |
| S5 | 3.5461E−05 | 1.8573E−05 | 6.9058E−06 | 1.4782E−06 | 0.0000E+00 | 0.0000E+00 | 0.0000E+00 |

Figure 4A:
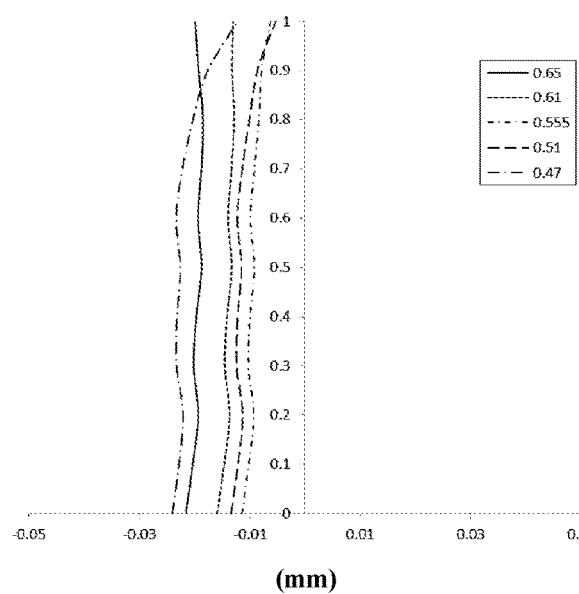
FIGS. 4A to 4D show a longitudinal aberration curve, astigmatism curve, distortion curve and lateral color curve of the camera optical lens according to Embodiment 2, respectively.
Figure 4B:
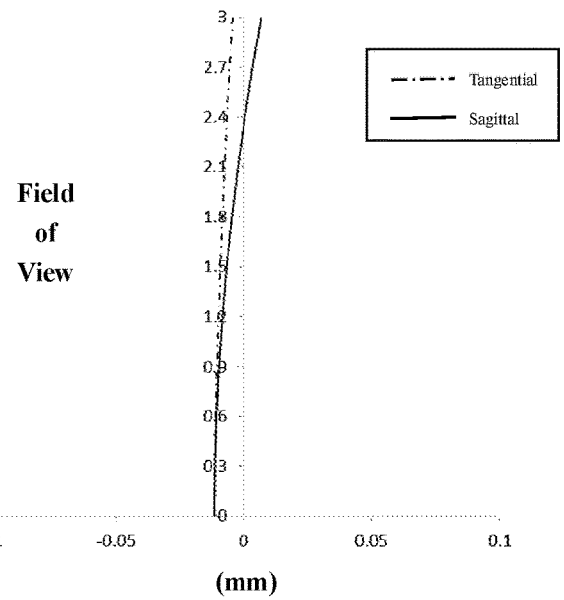
Figure 4C:
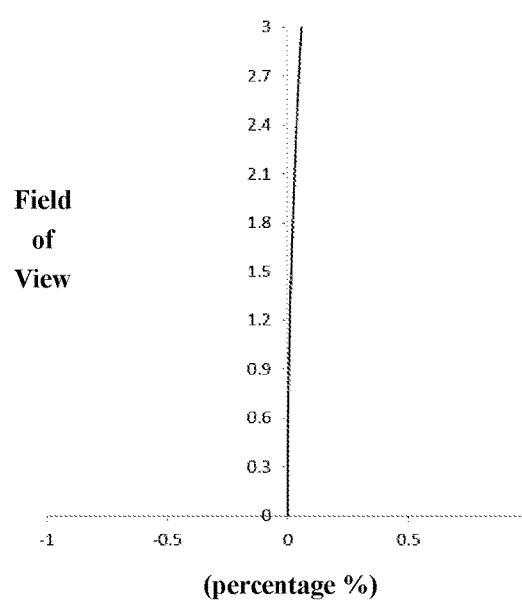
Figure 4D:
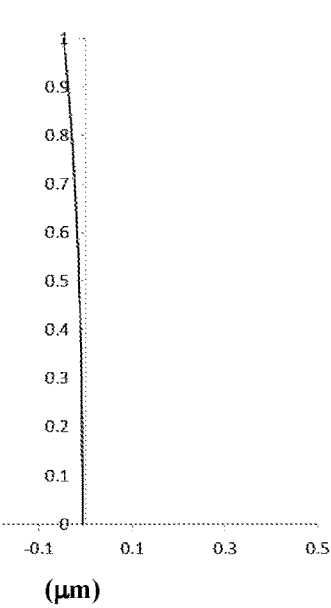

FIG. 4A shows a longitudinal aberration curve of the camera optical lens according to Embodiment 2, which represents the deviation of the converged focal point after light of different wavelengths passes through the camera lens. FIG. 4B shows an astigmatism curve of the camera optical lens according to Embodiment 2, which represents the curvature of the tangential image plane and the curvature of the sagittal image plane. FIG. 4C shows a distortion curve of the camera optical lens according to Embodiment 2, which represents distortion magnitude values corresponding to different fields of view. FIG. 4D shows a lateral color curve of the camera optical lens according to Embodiment 2, which represents the deviation of different image heights on the imaging plane after light passes through the camera lens. According to FIGS. 4A to 4D, it can be seen that the camera optical lens given in Embodiment 2 can achieve good imaging quality.

Embodiment 3

Figure 5:
FIG. 5 shows a schematic structural diagram of a camera optical lens according to Embodiment 3 of the present application.

A camera optical lens according to Embodiment 3 of the present application will be described below with reference to FIGS. 5 to 6D. FIG. 5 shows a schematic structural diagram of the camera optical lens according to Embodiment 3 of the present application.

As shown in FIG. 5, the camera optical lens according to an exemplary implementation of the present application includes a diaphragm STO, an optical path turning element E1, a second lens E2, and an imaging plane S6 in order from an object side to an image side.

The optical path turning element E1 is a deflecting prism, and has a positive refractive power and has an incident surface S1, a reflecting surface S2, and an exit surface S3, wherein the incident surface S1 is convex, the reflecting surface S2 is planar and the exit surface S3 is convex. Light incident along a Y optical axis through the incident surface S1 is reflected by the reflecting surface S2 and then exits along an X optical axis through the exit surface S3, wherein the Y optical axis is approximately perpendicular to the X optical axis and the reflecting surface S2 passes an intersection point of the Y optical axis and the X optical axis. The second lens E2 has a negative refractive power, and has a concave object side surface S4 and a convex image side surface S5. Light from an object sequentially passes through the respective surfaces S1 to S5 and finally forms an image on the imaging plane S6.

Table 5 shows a table of basic parameters of the camera optical lens of Embodiment 3, wherein the units of the radius of curvature, thickness, and focal length are all millimeters (mm). Table 6 shows higher-order coefficients of each aspheric lens surface that are applicable in Embodiment 3, wherein the surface shape of each aspheric surface can be defined by formula (1) given in Embodiment 1 described above.

TABLE 5

Embodiment 3: f = 24.20 mm, ImgH = 1.27 mm

| | | | | Material | | | |
|---|---|---|---|---|---|---|---|
| Surface No. | Surface type | Radius of curvature | Thickness | Refractive index | Dispersion coefficient | Focal length | Conic coefficient |
| OBJ | Spherical | Infinity | Infinity | | | | |
| STO | Spherical | Infinity | 0.0275 | | | | |
| S1 | Aspherical | 13.0613 | 2.4200 | 1.509 | 78.90 | 14.58 | −2.4287 |
| S2 | Spherical | Infinity | 2.4200 | 1.509 | 78.90 | | 0.0000 |
| S3 | Aspherical | −15.1318 | 0.7825 | | | | −6.4158 |
| S4 | Aspherical | −9.0717 | 2.1025 | 1.720 | 28.25 | −35.19 | 15.9732 |
| S5 | Aspherical | −15.4492 | 19.7730 | | | | 65.5990 |
| S6 | Spherical | Infinity | | | | | |

TABLE 6

| Surface No. | A4 | A6 | A8 | A10 | A12 | A14 | A16 |
|---|---|---|---|---|---|---|---|
| S1 | 1.3468E+03 | 1.1033E+03 | 6.8274E+02 | 3.2479E+02 | 1.1782E+02 | 3.1668E+01 | 5.9573E+00 |
| S3 | −1.5779E−03 | −1.6321E−04 | 2.7048E−06 | 3.4719E−06 | 5.1364E−07 | 5.9902E−07 | −9.1631E−07 |
| S4 | −1.4199E−01 | −1.6231E−02 | 2.6513E−04 | 4.0609E−03 | 2.9483E−03 | 8.1776E−04 | −2.5673E−04 |
| S5 | −1.8849E−01 | −8.2261E−03 | 1.6199E−02 | 7.4657E−03 | −2.7400E−03 | −4.5025E−03 | −1.4763E−03 |

| Surface No. | A18 | A20 | A22 | A24 | A26 | A28 | A30 |
|---|---|---|---|---|---|---|---|
| S1 | 6.9995E−01 | 3.8758E−02 | 5.3948E−04 | 2.8035E−04 | 3.7128E−05 | 0.0000E+00 | 0.0000E+00 |
| S3 | −3.9265E−07 | 4.1946E−08 | 0.0000E+00 | 0.0000E+00 | 0.0000E+00 | 0.0000E+00 | 0.0000E+00 |

TABLE 6-continued

| | | | | | | |
|---|---|---|---|---|---|---|
| S4 | −2.7002E−04 | −3.5666E−05 | 4.1372E−05 | 1.5166E−05 | 0.0000E+00 | 0.0000E+00 | 0.0000E+00 |
| S5 | 8.6137E−04 | 1.0797E−03 | 4.6701E−04 | 8.1484E−05 | 0.0000E+00 | 0.0000E+00 | 0.0000E+00 |

Figure 6A:
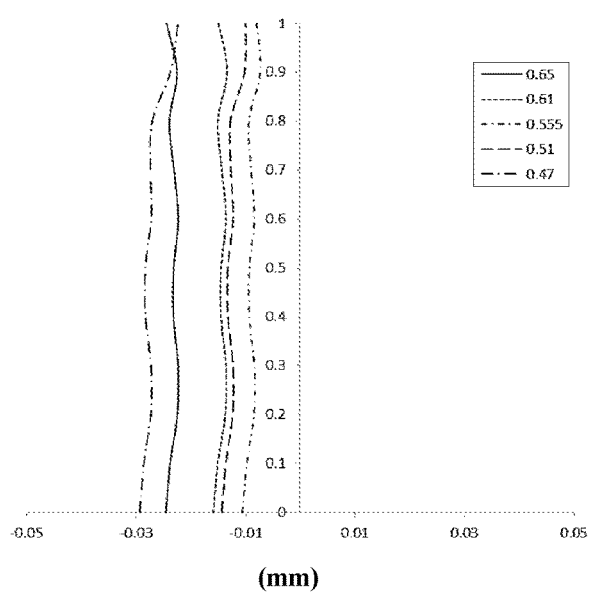
Figure 6B:
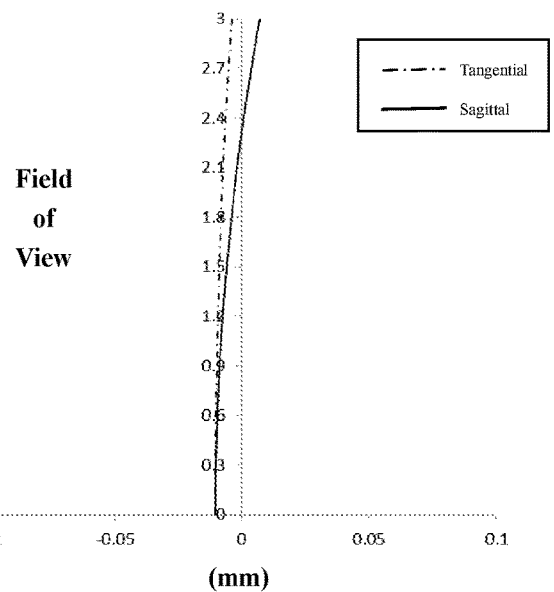

FIG. 6A shows a longitudinal aberration curve of the camera optical lens according to Embodiment 3, which represents the deviation of the converged focal point after light of different wavelengths passes through the camera lens. FIG. 6B shows an astigmatism curve of the camera optical lens according to Embodiment 3, which represents the curvature of the tangential image plane and the curvature of the sagittal image plane. FIG. 6C shows a distortion curve of the camera optical lens according to Embodiment 3, which represents distortion magnitude values corresponding to different fields of view. FIG. 6D shows a lateral color curve of the camera optical lens according to Embodiment 3, which represents the deviation of different image heights on the imaging plane after light passes through the camera lens. According to FIGS. 6A to 6D, it can be seen that the camera optical lens given in Embodiment 3 can achieve good imaging quality.

Embodiment 4

A camera optical lens according to Embodiment 4 of the present application will be described below with reference to FIGS. 7 to 8D. FIG. 7 shows a schematic structural diagram of the camera optical lens according to Embodiment 4 of the present application.

As shown in FIG. 7, the camera optical lens according to an exemplary implementation of the present application includes a diaphragm STO, an optical path turning element E1, a second lens E2, and an imaging plane S6 in order from an object side to an image side.

The optical path turning element E1 is a deflecting prism, and has a positive refractive power and has an incident surface S1, a reflecting surface S2, and an exit surface S3, wherein the incident surface S1 is convex, the reflecting surface S2 is planar and the exit surface S3 is convex. Light incident along a Y optical axis through the incident surface S1 is reflected by the reflecting surface S2 and then exits along an X optical axis through the exit surface S3, wherein the Y optical axis is approximately perpendicular to the X optical axis and the reflecting surface S2 passes an intersection point of the Y optical axis and the X optical axis. The second lens E2 has a negative refractive power, and has a concave object side surface S4 and a convex image side surface S5. Light from an object sequentially passes through the respective surfaces S1 to S5 and finally forms an image on the imaging plane S6.

Table 7 shows a table of basic parameters of the camera optical lens of Embodiment 4, wherein the units of the radius of curvature, thickness, and focal length are all millimeters (mm). Table 8 shows higher-order coefficients of each aspheric lens surface that are applicable in Embodiment 4, wherein the surface shape of each aspheric surface can be defined by formula (1) given in Embodiment 1 described above.

TABLE 7

Embodiment 4: f = 20.00 mm, ImgH = 1.05 mm

| Surface No. | Surface type | Radius of curvature | Thickness | Material Refractive index | Material Dispersion coefficient | Focal length | Conic coefficient |
|---|---|---|---|---|---|---|---|
| OBJ | Spherical | Infinity | Infinity | | | | |
| STO | Spherical | Infinity | 0.0250 | | | | |
| S1 | Aspherical | 10.4703 | 2.0000 | 1.497 | 81.14 | 12.60 | −2.9563 |
| S2 | Spherical | Infinity | 2.0000 | 1.497 | 81.14 | | 0.0000 |
| S3 | Aspherical | −13.6810 | 0.1711 | | | | −0.2361 |
| S4 | Aspherical | −8.2567 | 1.2118 | 1.740 | 21.19 | −32.72 | 14.1643 |
| S5 | Aspherical | −13.2710 | 17.1528 | | | | 73.6569 |
| S6 | Spherical | Infinity | | | | | |

TABLE 8

| Surface No. | A4 | A6 | A8 | A10 | A12 | A14 | A16 |
|---|---|---|---|---|---|---|---|
| S1 | 1.2243E+03 | 1.0030E+03 | 6.2068E+02 | 2.9527E+02 | 1.0711E+02 | 2.8788E+01 | 5.4157E+00 |
| S3 | −5.5908E−04 | −2.2594E−04 | 6.8953E−05 | −3.1945E−05 | 3.2269E−06 | −2.8566E−05 | −4.9552E−06 |
| S4 | −1.3274E−01 | −1.4892E−02 | 4.5064E−04 | 4.1508E−03 | 2.6309E−03 | 4.2424E−04 | −1.9909E−04 |
| S5 | −1.9225E−01 | −3.3131E−03 | 1.6884E−02 | 5.5113E−03 | −3.4949E−03 | −3.5109E−03 | −6.0871E−04 |

| Surface No. | A18 | A20 | A22 | A24 | A26 | A28 | A30 |
|---|---|---|---|---|---|---|---|
| S1 | 6.3654E−01 | 3.5160E−02 | 2.0824E−04 | 8.4103E−05 | 0.0000E+00 | 0.0000E+00 | 0.0000E+00 |
| S3 | 3.2115E−06 | −1.6384E−06 | 0.0000E+00 | 0.0000E+00 | 0.0000E+00 | 0.0000E+00 | 0.0000E+00 |
| S4 | −6.0144E−05 | 6.2912E−06 | −7.4521E−05 | −4.7944E−05 | 0.0000E+00 | 0.0000E+00 | 0.0000E+00 |
| S5 | 6.4829E−04 | 4.1537E−04 | 5.7855E−05 | −1.4287E−05 | 0.0000E+00 | 0.0000E+00 | 0.0000E+00 |

Figure 8A:
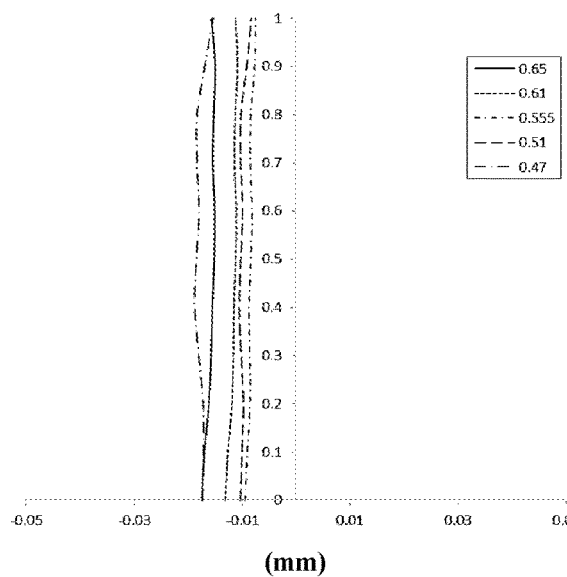
FIGS. 8A to 8D show a longitudinal aberration curve, astigmatism curve, distortion curve and lateral color curve of the camera optical lens according to Embodiment 4, respectively.
Figure 8B:
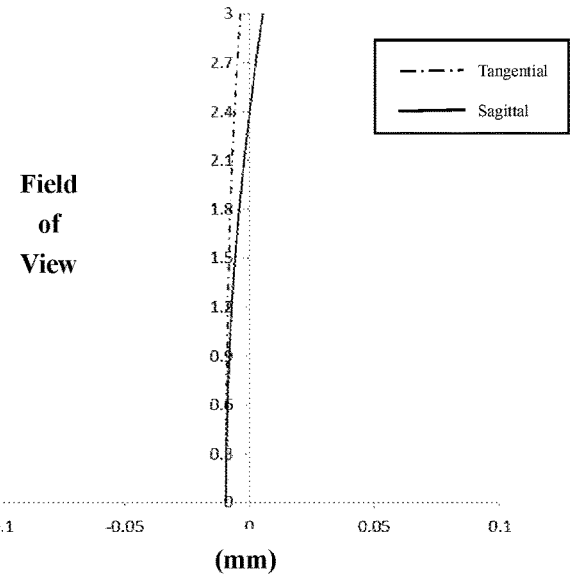
Figure 8C:
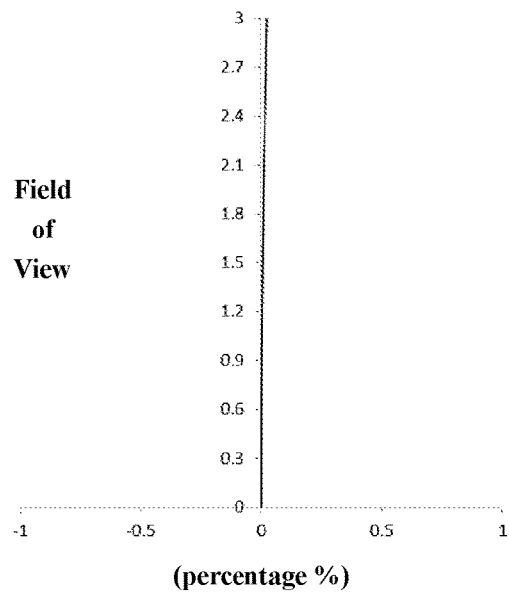
Figure 8D:
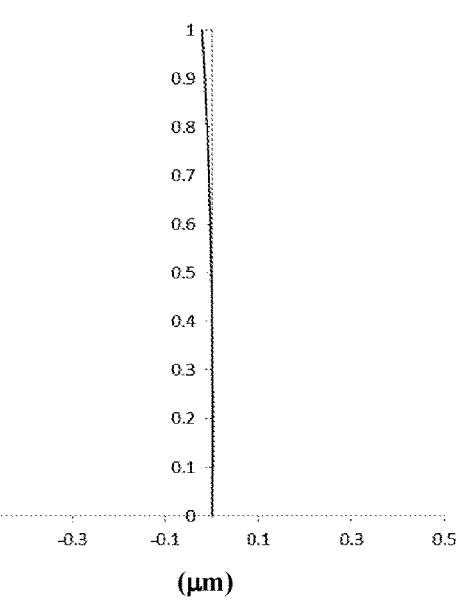

FIG. 8A shows a longitudinal aberration curve of the camera optical lens according to Embodiment 4, which represents the deviation of the converged focal point after light of different wavelengths passes through the camera lens. FIG. 8B shows an astigmatism curve of the camera optical lens according to Embodiment 4, which represents the curvature of the tangential image plane and the curvature of the sagittal image plane. FIG. 8C shows a distortion curve of the camera optical lens according to Embodiment 4, which represents distortion magnitude values corresponding to different fields of view. FIG. 8D shows a lateral color curve of the camera optical lens according to Embodiment 4, which represents the deviation of different image heights on the imaging plane after light passes through the camera lens. According to FIGS. 8A to 8D, it can be seen that the camera optical lens given in Embodiment 4 can achieve good imaging quality.

Embodiment 5

Figure 9:
FIG. 9 shows a schematic structural diagram of a camera optical lens according to Embodiment 5 of the present application.

A camera optical lens according to Embodiment 5 of the present application will be described below with reference to FIGS. 9 to 10D. FIG. 9 shows a schematic structural diagram of the camera optical lens according to Embodiment 5 of the present application.

As shown in FIG. 9, the camera optical lens according to an exemplary implementation of the present application includes a diaphragm STO, an optical path turning element E1, a second lens E2, and an imaging plane S6 in order from an object side to an image side.

The optical path turning element E1 is a deflecting prism, and has a positive refractive power and has an incident surface S1, a reflecting surface S2, and an exit surface S3, wherein the incident surface S1 is convex, the reflecting surface S2 is planar and the exit surface S3 is convex. Light incident along a Y optical axis through the incident surface S1 is reflected by the reflecting surface S2 and then exits along an X optical axis through the exit surface S3, wherein the Y optical axis is approximately perpendicular to the X optical axis and the reflecting surface S2 passes an intersection point of the Y optical axis and the X optical axis. The second lens E2 has a negative refractive power, and has a concave object side surface S4 and a convex image side surface S5. Light from an object sequentially passes through the respective surfaces S1 to S5 and finally forms an image on the imaging plane S6.

Table 9 shows a table of basic parameters of the camera optical lens of Embodiment 5, wherein the units of the radius of curvature, thickness, and focal length are all millimeters (mm). Table 10 shows higher-order coefficients of each aspheric lens surface that are applicable in Embodiment 5, wherein the surface shape of each aspheric surface can be defined by formula (1) given in Embodiment 1 described above.

TABLE 9

Embodiment 5: f = 30.00 mm, ImgH = 1.57 mm

| Surface No. | Surface type | Radius of curvature | Thickness | Refractive index | Dispersion coefficient | Focal length | Conic coefficient |
|---|---|---|---|---|---|---|---|
| OBJ | Spherical | Infinity | Infinity | | | | |
| STO | Spherical | Infinity | 0.0250 | | | | |
| S1 | Aspherical | 15.6388 | 3.0000 | 1.497 | 81.14 | 18.54 | −2.2531 |
| S2 | Spherical | Infinity | 3.0000 | 1.497 | 81.14 | | 0.0000 |
| S3 | Aspherical | −19.6742 | 0.6788 | | | | −4.5437 |
| S4 | Aspherical | −11.8833 | 2.2649 | 1.740 | 21.19 | −46.59 | 13.9110 |
| S5 | Aspherical | −19.5428 | 25.0005 | | | | 70.4326 |
| S6 | Spherical | Infinity | | | | | |

TABLE 10

| Surface No. | A4 | A6 | A8 | A10 | A12 | A14 | A16 |
|---|---|---|---|---|---|---|---|
| S1 | 1.8365E+03 | 1.5045E+03 | 9.3101E+02 | 4.4290E+02 | 1.6067E+02 | 4.3183E+01 | 8.1236E+00 |
| S3 | −1.6393E−03 | −1.7226E−04 | 1.5864E−05 | 9.7281E−06 | 4.6610E−06 | −3.5075E−06 | −2.5867E−06 |
| S4 | −2.0007E−01 | −2.2257E−02 | 8.8921E−04 | 6.1072E−03 | 3.8401E−03 | 7.6928E−04 | −2.8309E−04 |
| S5 | −2.8307E−01 | −6.7107E−03 | 2.5762E−02 | 8.5231E−03 | −5.3640E−03 | −5.3607E−03 | −8.8538E−04 |

| Surface No. | A18 | A20 | A22 | A24 | A26 | A28 | A30 |
|---|---|---|---|---|---|---|---|
| S1 | 9.5473E−01 | 5.2769E−02 | 3.7512E−04 | 1.4773E−04 | 0.0000E+00 | 0.0000E+00 | 0.0000E+00 |
| S3 | 6.4553E−07 | −2.4676E−07 | 0.0000E+00 | 0.0000E+00 | 0.0000E+00 | 0.0000E+00 | 0.0000E+00 |
| S4 | −1.5291E−04 | −4.2934E−05 | −6.5103E−05 | −3.4630E−05 | 0.0000E+00 | 0.0000E+00 | 0.0000E+00 |
| S5 | 1.0342E−03 | 6.4615E−04 | 9.6649E−05 | −1.7399E−05 | 0.0000E+00 | 0.0000E+00 | 0.0000E+00 |

Figure 10A:
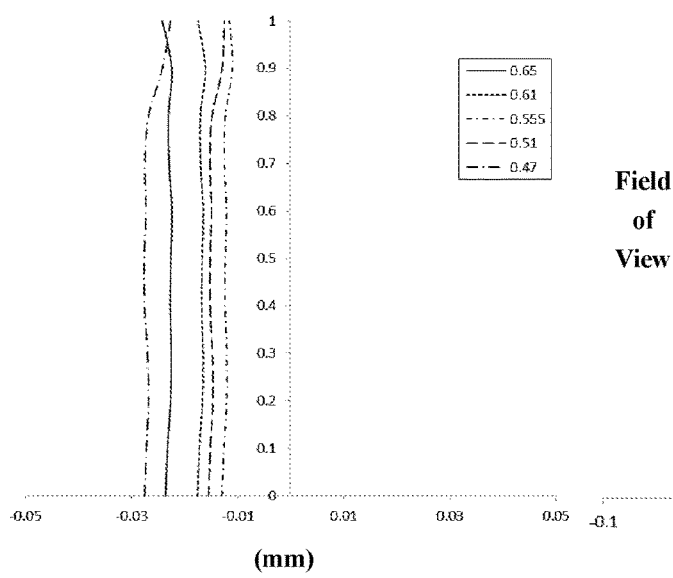
FIGS. 10A to 10D show a longitudinal aberration curve, astigmatism curve, distortion curve and lateral color curve of the camera optical lens according to Embodiment 5, respectively.
Figure 10B:
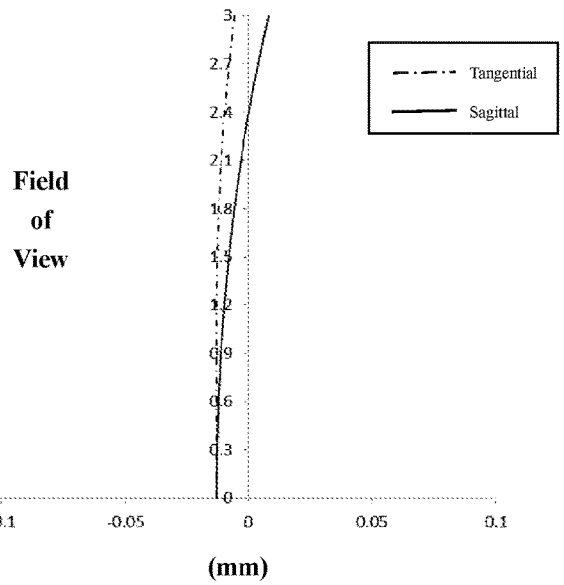
Figures 10C, 10D:
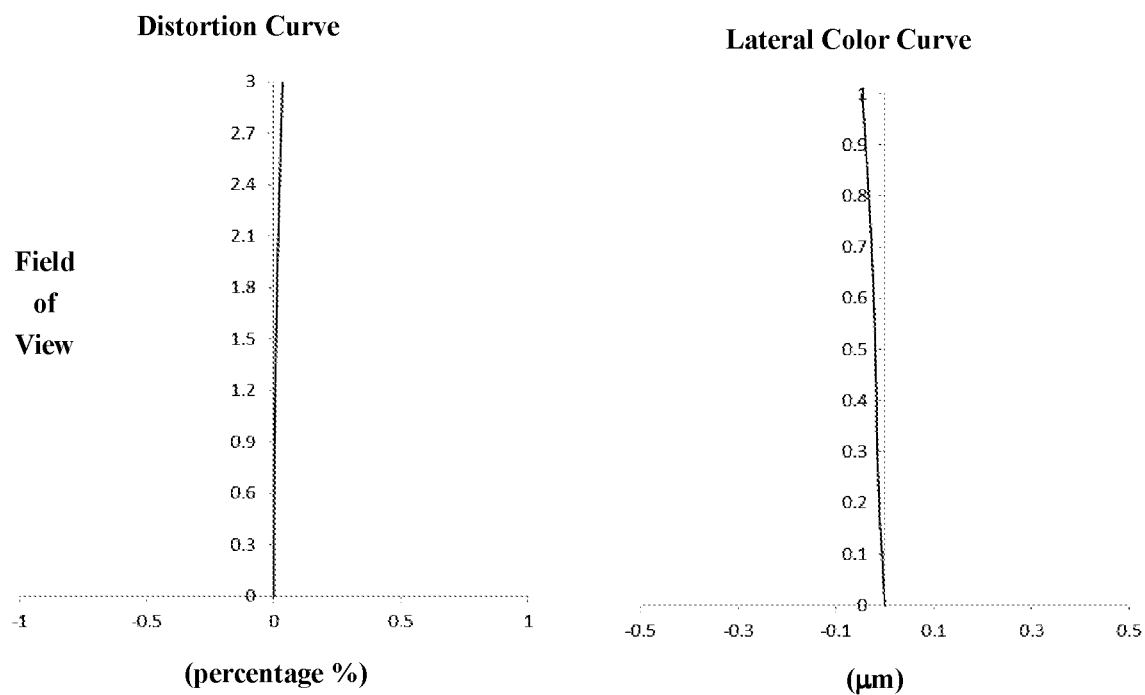

FIG. 10A shows a longitudinal aberration curve of the camera optical lens according to Embodiment 5, which represents the deviation of the converged focal point after light of different wavelengths passes through the camera lens. FIG. 10B shows an astigmatism curve of the camera optical lens according to Embodiment 5, which represents the curvature of the tangential image plane and the curvature of the sagittal image plane. FIG. 10C shows a distortion curve of the camera optical lens according to Embodiment 5, which represents distortion magnitude values corresponding to different fields of view. FIG. 10D shows a lateral color curve of the camera optical lens according to Embodiment 5, which represents the deviation of different image heights on the imaging plane after light passes through the camera lens. According to FIGS. 10A to 10D, it can be seen that the camera optical lens given in Embodiment 5 can achieve good imaging quality.

In summary, Embodiments 1 to 5 satisfy the relationships shown in Table 11, respectively.

TABLE 11

| Conditional expression | Embodiment | | | | |
|---|---|---|---|---|---|
| | 1 | 2 | 3 | 4 | 5 |
| EPP (mm) | 0.03 | 0.03 | 0.03 | 0.03 | 0.03 |
| f/BFL | 1.22 | 1.22 | 1.22 | 1.17 | 1.20 |
| f/f1 | 1.90 | 1.90 | 1.66 | 1.59 | 1.62 |
| f/f2 | −0.93 | −0.93 | −0.69 | −0.61 | −0.64 |
| EPD/ImgH | 2.84 | 2.98 | 2.39 | 2.29 | 2.29 |
| (V1 + V2)/2 | 54.08 | 54.08 | 53.58 | 51.17 | 51.17 |
| N2−N1 | 0.16 | 0.16 | 0.21 | 0.24 | 0.24 |
| f/CT2 | 10.40 | 10.40 | 11.51 | 16.50 | 13.25 |

The present application further provides an imaging apparatus, of which an electronic photosensitive element may be a Charge-coupled Device (CCD) or a complementary metal oxide semiconductor element (CMOS). The imaging apparatus may be an independent imaging apparatus such as a digital camera, or may be an imaging module integrated in a mobile electronic device such as a mobile phone. The imaging apparatus is equipped with the camera optical lens described above.

The above description is only the preferred embodiments of the present application and the explanation of the applied technical principle. It should be understood by those skilled in the art that the scope of disclosure involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

What is claimed is:

1. A camera optical lens, comprising, in order from an object side to an image side:
   an optical path turning element, having a refractive power and having an incident surface, a reflecting surface and an exit surface, wherein both the incident surface and the exit surface are aspherical lens surfaces, the reflecting surface is a planar lens surface, and the optical path turning element is configured so that light incident on the optical path turning element through the incident surface along a direction of a Y optical axis is reflected by the reflecting surface and then exits through the exit surface along a direction of an X optical axis, where the direction of the Y optical axis and the direction of the X optical axis cross each other; and
   a second lens, having a refractive power, wherein the second lens is the only lens between the optical path turning element and the image side,
   wherein a total effective focal length f of the camera optical lens satisfies 20 mm≤f≤30 mm,
   wherein an Abbe number V1 of the optical path turning element and an Abbe number V2 of the second lens satisfy 51.17<(V1+V2)/2<54.08,
   wherein the total effective focal length f of the camera optical lens and a distance BFL from an image side surface of the second lens to an imaging plane of the camera optical lens on the X optical axis satisfy 1<f/BFL<1.5.

2. The camera optical lens according to claim 1, wherein the Y optical axis is approximately perpendicular to the X optical axis.

3. The camera optical lens according to claim 1, wherein the camera optical lens further comprises a diaphragm arranged between the object side and the optical path turning element, and
   a distance EPP from the diaphragm to the incident surface of the optical path turning element on the X optical axis satisfies 0 mm<EPP<0.1 mm.

4. The camera optical lens according to claim 1, wherein the total effective focal length f of the camera optical lens and an effective focal length f1 of the optical path turning element satisfy 1.5<f/f1<2.0.

5. The camera optical lens according to claim 1, wherein the total effective focal length f of the camera optical lens and an effective focal length f2 of the second lens satisfy −1.0<f/f2<−0.5.

6. The camera optical lens according to claim 1, wherein an entrance pupil diameter EPD of the camera optical lens and a half of a diagonal length ImgH of an effective pixel region on an imaging plane of the camera optical lens satisfy 2.0<EPD/ImgH≤3.0.

7. The camera optical lens according to claim 1, wherein a refractive index N1 of the optical path turning element and a refractive index N2 of the second lens satisfy 0.15≤N2−N1<0.3.

8. The camera optical lens according to claim 1, wherein the total effective focal length f of the camera optical lens and a center thickness CT2 of the second lens on the X optical axis satisfy 10≤f/CT2≤17.

* * * * *